May 2, 1939.  A. C. VAN HOOYDONK  2,157,039

PISTON CONSTRUCTION

Filed April 28, 1938

Inventor,
Adrian C. Van Hooydonk,
by Walter P. Geyer
Attorney.

Patented May 2, 1939

2,157,039

UNITED STATES PATENT OFFICE 2,157,039

PISTON CONSTRUCTION

Adrian C. Van Hooydonk, Buffalo, N. Y., assignor to John E. Smith's Sons Company, Buffalo, N. Y., a corporation of New York Application April 28, 1938, Serial No. 204,791

4 Claims. (Cl. 309—4)

This invention relates to certain new and useful improvements in piston construction of the type used in sausage stuffing machines.

It has for one of its objects to provide a piston of this character having simple and efficient packing means for effectually preventing leakage of air, water or meat past the piston during its operative stroke.

Another object of the invention is the provision of simple means for adjustably connecting the piston-sections for movement toward and from each other and for preventing the escape of air between such sections and about such adjustable means into the cylinder above the piston.

Figure 1:
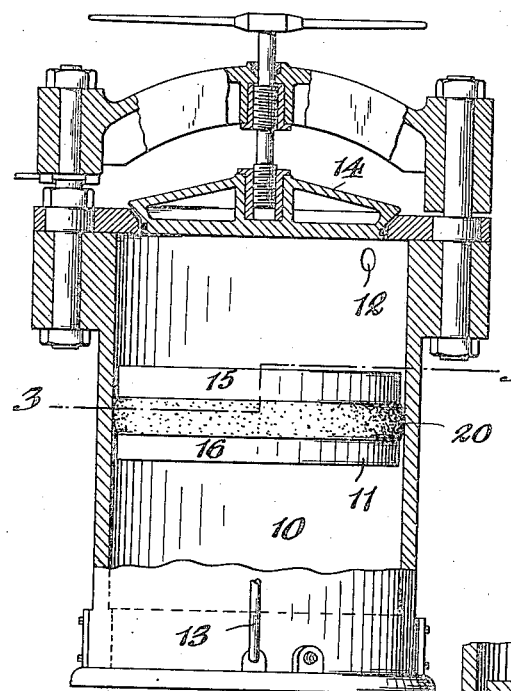
Figure 4:
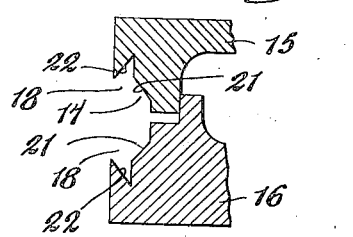
Figure 2:
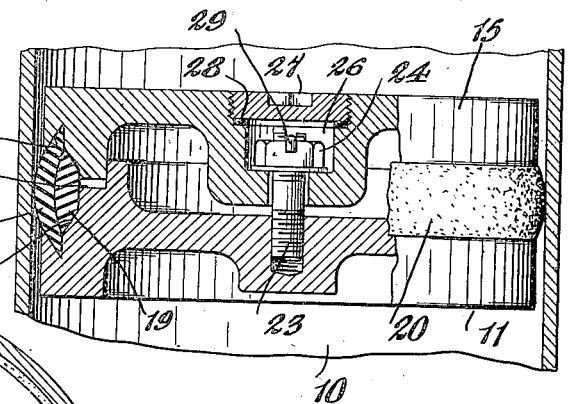
Figure 3:
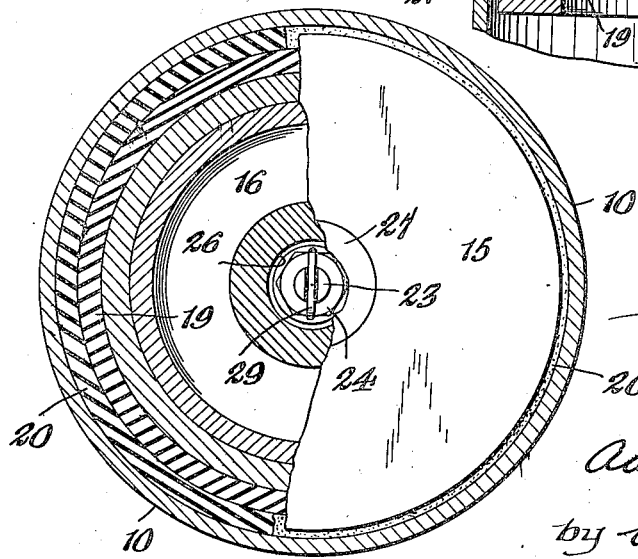

In the accompanying drawing:

Figure 1 is a sectional side view of a sausage stuffer equipped with my improved piston. Figure 2 is an enlarged sectional elevation of the improved piston in its cylinder. Figure 3 is a horizontal section taken on lines 3—3, Figure 1. Figure 4 is a fragmentary cross section of the piston with the packing means removed.

Similar characters of reference indicate corresponding parts throughout the several views.

In the stuffer shown in the drawing, by way of example, 10 indicates the customary upright cylinder for receiving the sausage or chopped meat and 11 indicates the piston which is freely operable in the cylinder for ejecting the sausage or meat-dough therefrom on its upstroke through the customary discharge openings in the cylinder, one of such openings being indicated at 12.

The lower end of the cylinder is closed and leading thereto is a pipe 13 for admitting the motive fluid under pressure into the cylinder for raising the piston to eject the contents therefrom. After the contents are ejected, the piston drops by gravity to the bottom of the cylinder. The upper end of the cylinder is provided with the customary filling opening and suitable closure 14 for closing and sealing such opening during the discharge stroke of the piston.

In its preferred construction the piston comprises upper and lower spaced sections 15, 16 which are adjustably connected for movement toward and from each other and between the adjoining peripheral portions of which are mating inner and outer concentric grooves, indicated generally by the numerals 17 and 18, which jointly form a single groove for receiving a compressible packing means 19, 20 of rubber or like material to provide a leak-proof joint or seal between the piston and the cylinder. The inner groove 17 is of less height than the outer groove and terminates at its upper and lower ends in inwardly-converging seats 21, while the outer groove 18 extends above and below the corresponding ends of the inner groove and terminates at its opposite ends in outwardly-converging seats 22 in the manner shown in Figure 4, the angular disposition of these seats being substantially the same but in opposing diverging relation. The packing means, by preference, consists of an inner ring 19 having its upper and lower ends shaped to fit the ends of the companion inner groove 17 and an outer ring 20 in concentric, abutting relation to said inner ring and having its upper and lower ends shaped to fit the seats 22 of the outer groove 18, as shown in Figure 2. By this construction, a contraction of the piston sections 15 and 16, during its upward stroke to discharge the sausage from the cylinder, causes an outward deflection or bilging of the packing ring 20 into sealing engagement with the cylinder which is more or less controlled by the angular disposition of the packing seats 22, while the companion inner ring 19 acts as a resilient backing to resist inward deflection of the outer ring 20 and by reason of the angular disposition of the packing seats 21, tends to distend such inner ring radially outward to transmit a like distention to the medial portion of the outer ring, all to the end of making for a firm, seal-proof joint between the piston and the cylinder and effectively prevent leakage of air, water or meat past the same. On the down or idle stroke of the piston its sections expand or separate to effect a corresponding contraction of the packing means 19, 20 from sealing engagement with the cylinder, to thereby allow the free downward movement of the piston in the cylinder.

The piston-sections 15, 16 may be joined together by a screw stud 23 rising from the lower section and passing freely through an opening in the upper section, a nut 24 being applied to the upper end of the stud to clamp the sections together in their properly adjusted position. A space 25 is provided between the opposing marginal edges of the piston-sections which is bridged by the packing ring 19, permitting relative movement of the sections toward and from each other. As shown in Figure 2, the screw stud nut 24 is arranged within a recess 26 in the upper piston section 15 and a screw plug 27 is fitted therein to form a closure therefor. To prevent the escape of air from between the piston-sections and through the screw plug joint into the cylinder, a sealing gasket 28 is provided between the plunger and its junction with the marginal top rim of the recess.

In order to prevent the piston-sections and compressible packing accidentally being disturbed after being adjusted properly to the cylinder wall, and which disturbance may result from loosening of the stud-engaging nut 24, a cotter or like pin 29 is provided for locking the nut in its adjusted set position on the stud 23.

I claim as my invention:

1. A piston of the character described, comprising upper and lower sections having mating inner and outer concentric grooves in the adjoining portions of their peripheries, the end seats of the outer groove converging outwardly and the companion seats of the inner groove converging inwardly, and compressible packing members disposed in concentric abutting relation in said grooves and engaging the respective end seats thereof.

2. A piston of the character described, comprising upper and lower sections having mating inner and outer concentric grooves in the adjoining portions of their peripheries, the inner groove being counter to and of less heighth than the outer groove and the respective end seats thereof being disposed in opposing angular relation, and compressible packing members disposed in concentric abutting relation in said grooves.

3. A piston of the character described, comprising upper and lower sections including means for adjusting them toward and from each other and having a peripheral groove between the adjoining portions thereof, said groove having an inner portion terminating at its ends in inwardly-converging seats and a concentric outer portion terminating at its ends in outwardly-converging seats extending above and below those of the companion seats, and compressible packing means disposed in said groove and having its end shaped to conform with said seats, respectively.

4. A piston of the character described, comprising upper and lower sections including means for adjusting them toward and from each other and having a peripheral groove between the adjoining portions thereof, said groove having an inner portion terminating at its ends in inwardly-converging seats and a concentric outer portion terminating at its ends in outwardly-converging seats extending above and below those of the companion seats, and concentrically-arranged compressible packing means fitted in said groove and engaging their respective seats, the inner member causing an outward bilging and resisting an inward displacement of the outer packing member.

ADRIAN C. VAN HOOYDONK.